United States Patent [19]

Makkink

[11] Patent Number: 4,495,875
[45] Date of Patent: Jan. 29, 1985

[54] ADMINISTERING OF AGRICULTURAL CHEMICALS IN LIQUID FORM

[76] Inventor: Andrew E. Makkink, P.O. Box 14, Sannieshof, 2760, Transvaal Province, R.S.A., South Africa

[21] Appl. No.: 420,657

[22] Filed: Sep. 21, 1982

[30] Foreign Application Priority Data

Oct. 23, 1981 [ZA] South Africa ............... 81/7370

[51] Int. Cl.³ ............................................. A01C 3/00
[52] U.S. Cl. ........................................ 111/7; 111/73
[58] Field of Search ............... 47/48.5; 111/6, 7, 80, 111/73, 85; 239/172

[56] References Cited

U.S. PATENT DOCUMENTS

| 2,159,652 | 5/1939 | Brunner | 111/73 |
|---|---|---|---|
| 3,257,753 | 6/1966 | Zennie | 47/1.5 |
| 3,285,516 | 11/1966 | Waldrum | 239/172 X |
| 3,293,799 | 12/1966 | Keller et al. | 47/48.5 |
| 3,348,505 | 10/1967 | Smith | 111/73 |
| 3,605,657 | 9/1971 | Brannan | 111/7 |
| 4,296,885 | 10/1981 | Norden et al. | 239/172 X |
| 4,424,757 | 1/1984 | Gibbens | 111/7 |

FOREIGN PATENT DOCUMENTS

| 2742193 | 3/1973 | Fed. Rep. of Germany . |
|---|---|---|
| 918840 | 2/1947 | France . |
| 1589582 | 3/1970 | France . |
| 2028276 | 10/1970 | France . |
| 729771 | 5/1955 | United Kingdom . |

OTHER PUBLICATIONS

Guillermo Frick, "Observaciones sobre el cultivo del trigo" i.e. Boletines de la Soc. Mac. de Agricultura (ano 1877), *Manuel de Fertilizantes*, Centro Regional de Ayuda Tecnica, Organizacion de las Naciones Unidas P. la agricult. y la alimentac (AID) Mejico, 1965, p. 185.
Vladimir Ignatieff, y H.J. Page: ONU para la agricult, y la aliment., Roma, 1957.
Prof. (em) Dr. Czeslaw Kanafojski, "Dunge-, Sa- and Pflanzmaschinen", Editado por Veb Verlag Tecnik Berlin, Bestellnummer 551 993 O. Terminado de redactar al 15/3/1972.

*Primary Examiner*—James R. Feyrer
*Attorney, Agent, or Firm*—Karl W. Flocks; Sheridan Neimark

[57] ABSTRACT

Apparatus 10 administers agricultural chemicals in liquid form to a land. Agricultural chemical 54 is fed from a reservoir 52 to a liquid chemical container 12. Control means 16, for example level control means including a float valve arrangement, controls the inflow of liquid chemical into the container 12 to keep liquid chemical within the container at a constant level. Liquid chemical flows under gravity under a constant hydraulic head via a composite flow line 18, (44, 46,50) and flow restrictors 20 to administering means 22 which deposits it on a land, conveniently in furrows in a seed bed. Flow rate adjustment takes place by selecting suitable flow restrictors 20, or by adjustment of the control means 16 to effect a suitable level (hydraulic head), or both.

5 Claims, 10 Drawing Figures

ADMINISTERING OF AGRICULTURAL CHEMICALS IN LIQUID FORM

This invention relates to the administering of agricultural chemicals in liquid form to a receiving medium. The agricultural chemicals may be in the form of herbicides, insecticides, fertilizers, or the like. The receiving medium may be in the form of soil such as a seed bed, a plant or the like.

In accordance with the invention, there is provided a method of administering an agricultural chemical in liquid form to a receiving medium, the method comprising providing a supply of the liquid chemical at an elevated position above the receiving medium;

permitting the liquid chemical to flow under gravity at a desired flow rate to the receiving medium; and maintaining the hydraulic head of the liquid chemical at a substantially constant level while outflow is taking place.

The desired flow rate may be obtained by restricting the flow by means of a flow restrictor.

When the receiving medium is soil, the method may include furrowing the surface of the soil to a desired depth;

introducing the liquid chemical into the furrow; and closing the furrow when the liquid chemical has been administered. If desired, soil used to close the furrow may be compacted.

The invention extends to an apparatus for administering an agricultural chemical in liquid form to a receiving medium, the apparatus comprising a liquid chemical container to contain liquid chemical in use, and having attachment means for attachment to a support at a desired elevation above the receiving medium, an outlet at a relatively low level to permit liquid chemical to flow out of the container under gravity;

control means adapted to maintain the hydraulic head of the liquid chemical in the container at a substantially constant level while outflow takes place;

at least one flow line connected to the outlet of the container for conducting liquid chemical from the container to the receiving medium; and flow-restricting means associated with the flow line to restric the flow of liquid chemical to a desired rate.

The control means may comprise level control means to control flow of liquid from a reservoir to the container, thereby to maintain the liquid chemical in the container at the desired level. The level control means may be in the form of a buoyancy valve arrangement.

The flow restricting means may comprise a flow restrictor in the flow line. The flow restrictor may conveniently be replacable to provide for selecting a flow restrictor having a suitable flow restricting capability for the conditions at hand. When liquid chemical is to be administered at a plurality of positions, a corresponding plurality of flow lines, each having its own flow restrictor, may conveniently be provided.

When the receiving medium is soil, the apparatus may be movable over the soil, the apparatus comprising a furrowing device for furrowing the surface of the soil;

liquid chemical administering means arranged relative to the furrowing device, with respect to the intended direction of motion, to deposit liquid chemical into the furrow; and a closing device arranged relative to the furrowing device and the administering means, with respect to the intended direction of motion, to close the furrow after the liquid chemical has been deposited therein.

The furrowing device may comprise one or more blades arranged to cut into and laterally displace soil, in use. The blade or blades may be in the form of one or more discs. The discs may, for example, be dished discs, or they may be flat, coulter like discs.

The closing device may comprise one or more wheels arranged in use, laterally to displace soil back into the furrow and to roll along the top of the closed furrow. Instead, the closing device may comprise one or more discs, which may be dished discs or flat, coulter-like discs.

The invention extends to the combination of an apparatus as herein described with an agricultural implement, the apparatus being mounted on the agricultural implement.

The combination may be adapted to administer a plurality of chemicals in one operation, a corresponding plurality of apparatuses being provided mounted on the agricultural implement. When the agricultural implement is relatively wide, the combination may conveniently be adapted for operation also on a laterally sloping surface, a plurality of apparatuses being provided, the containers whereof being mounted spaced along the width of the implement, the apparatuses being arranged to administer the or each liquid chemical in adjacent lanes of limited width.

When a wide implement, mounting a single liquid chemical container feeding a plurality of flow lines to administer the chemical at laterally spaced positions, moves over a laterally sloping surface, the hydraulic head applied at different flow restrictors of the different flow lines will differ. Furthermore, the hydraulic head applied at any one flow restrictor will change with changing slope if the container and the flow restrictor are laterally spaced. Therefore, if laterally spaced containers are provided, each serving, ideally, only one flow restrictor disposed directly underneath it; or, as a compromise, serving one or more flow restrictors closely laterally spaced from the container, the above problem will be illiminated or alleviated.

Conveniently, the implement may be of a kind which has a furrowing device or a closing device, or both. Then the furrowing or closing device of the implement may provide the furrowing or closing device of the apparatus. Thus, conveniently, the apparatus may be mounted on an agricultural seed planter, a cultivating implement, an off-set disc harrow, or the like.

For example, when the apparatus is mounted on an off-set disc harrow, the administering means will, in use, deposit liquid chemical in the furrows opened by the leading gang of discs, and the trailing gang of discs will cover the deposited liquid chemical with soil. In this fashion, area coverage, as opposed to lane coverage, can effectively be obtained.

The invention is now described by way of example with reference to the accompanying diagrammatic drawings.

Figure 1:
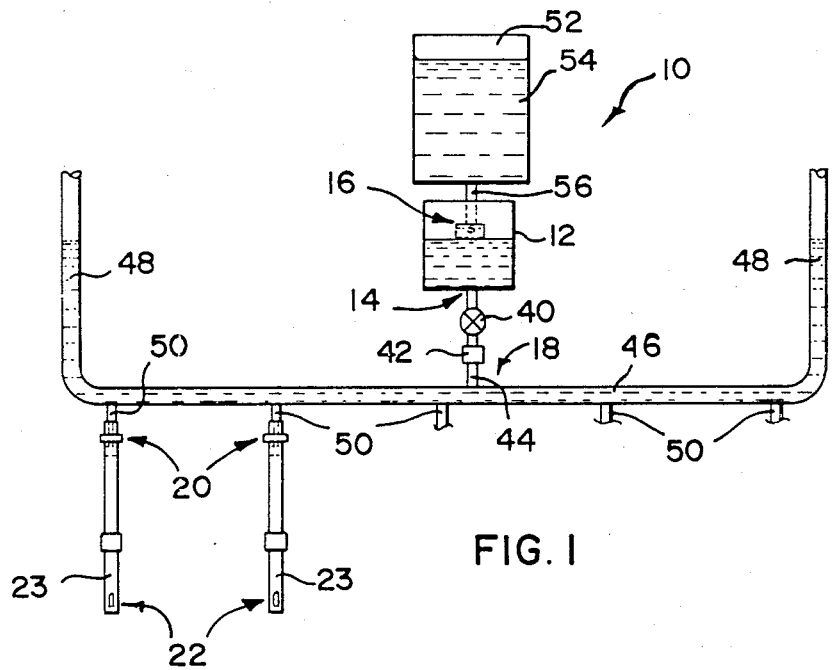
FIG. 1 shows, schematically, in rear view along line I—I of FIG. 2, an apparatus in accordance with the invention.
Figure 2:
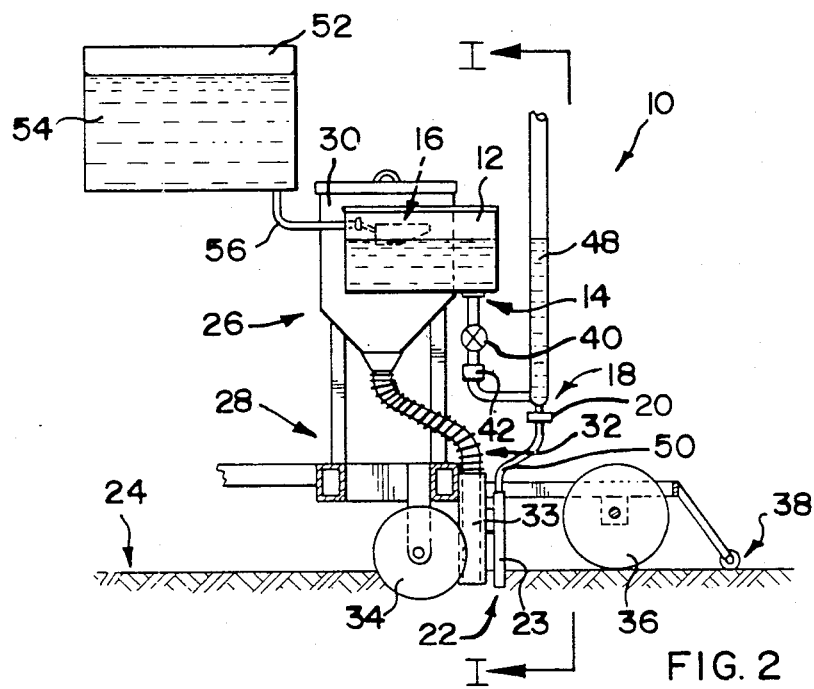
FIG. 2 shows, schematically, in side view, the apparatus of FIG. 1, mounted on an agricultural seed planter.

With reference to FIGS. 1 and 2 of the drawings, an apparatus for administering a chemical in liquid form to soil which may be in the form of a seed bed, in accordance with the invention, is generally indicated by reference numeral 10. The aparatus 10 comprises a liquid chemical container 12 having an outlet 14 at a low level and level control means in the form of a buoyancy valve or float valve arrangement 16. The apparatus 10 further comprises a composite flow line 18, a plurality of flow-restrictors 20 within branch lines 50 of the composite flow line 18, and a plurality of administering means 22 for administering the liquid chemical to a seed bed indicated by reference numeral 24 in FIG. 2.

In FIG. 2, the apparatus 10 is shown mounted on an agricultural seed planter 26. For clarity, the seed planter is not shown in FIG. 1. The planter 26 has a frame 28 supporting the apparatus 10. The planter 26 has a fertilizer container 30 to administer fertilizer in granular form to the seed bed 24 via fertilizer conduits 32, of which one only is shown.

The planter 26 has a furrowing device, associated with each administering means 22, in the form of a pair of coulter-like discs 34 arranged in rearwardly and upwardly diverging configuration to open a furrow in the seed bed 24 as the planter 26 is drawn along a land. The fertilizer conduit 32 associated with the administering means 22 shown, terminates in a metal spout 33, the lower end of which is disposed between the divergent trailing ends of the discs 34. Two wheels 36 trail the discs 34. The wheels 36 are arranged in upwardly diverging configuration to displace soil back into the furrow opened by the discs 34 and to roll along the closed furrow gently to compact the soil into the furrow. A chain arrangement 38 trails the wheels 36 to level the seed bed 24 behind the planter 26.

The composite flow line 18 comprises a supply line 44 leading from the outlet 14 of the container 12 via a stop valve 40 and a filter 42 into a distributing line 46. The distributing line 46 will be disposed transversely to the direction of motion of the planter 26. The branch lines 50 branch out at spaced intervals from the distributing line 46 and lead via the flow-restrictors 20 to the administering means 22. The distributing line 46 terminates at either end in upwardly directed balance lines 48, in which excess liquid chemical is allowed to collect.

The container 12 is, in use, filled from a reservoir 52 which contains a supply of liquid chemical 54. A conduit 56 leads from the reservoir 52 to the container 12. The float valve arrangement 16 co-operates with the end of the conduit 56 to maintain liquid chemical within the container 12 at a desired, substantially constant, level.

Figure 3:
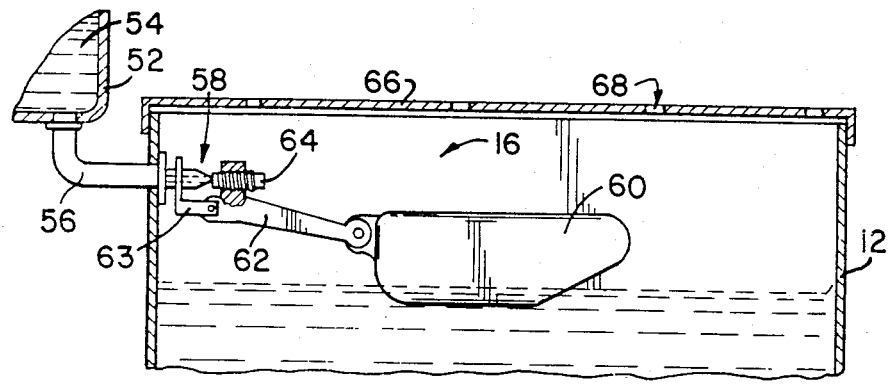
FIG. 3 shows, to a larger scale, in sectional side view, a liquid chemical container and control means of the apparatus of FIG. 1.

With reference to FIG. 3, the working of the float valve arrangement 16 is described in more detail. The conduit 56 terminates in a nozzle 58 projecting into the upper region of the container 12. The reservoir 52 is spaced above the container 12. The float valve arrangement 16 comprises a float 60 which is buoyant with respect to the liquid chemical for which it is intended. The float 60 is pivotally connected via a pivot arm 62 to a bracket 63 mounted on the end of the conduit 56. An adjustable closure element 64 is provided at one end of the pivot arm 62, remote from the float 60 and in register with the nozzle 58. Downward movement of the float 60 will withdraw the closure element 64 from the nozzle 58, thus allowing liquid chemical to flow from the reservoir 52 into the container 12. Conversely, upward movement of the float 60 will close the nozzle 58, thus terminating flow of liquid chemical to the container 12. The position of the closure element 64 can be adjusted such that the nozzle 58 is opened and closed when the float 60 deviates from a preselected level. A cover 66, having vent holes 68, covers the container 12.

Figure 4:
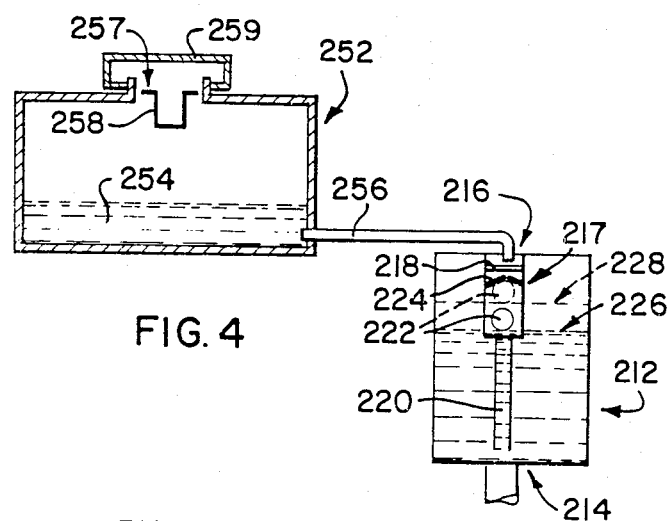
FIGS. 4 and 5 show, in sectional side views, further embodiments of liquid chemical containers and control means.

With reference to FIG. 4, another embodiment of a liquid chemical container 212 and level control means 216 is shown. Liquid chemical 254 is fed from a reservoir 252 via a conduit 256 to the container 212. The reservoir has a filler opening 257 within which a strainer 258 is provided and which is closable by means of a filler cap 259. An end of the conduit 256 enters the top of the container 212 and opens in the upper region of a chamber 217. A fine strainer 218 is provided downstream of the open end of the conduit 256 across the chamber 217. The lower end of the chamber 217 is in communication with a pipe 220 having an open end near an outlet 214 of the container 212 at a low level. A valve closure member in the form of a float 222, and complemental valve seat 224 are provided intermediate the fine strainer 218 and the lower end of the chamber 217. When the liquid chemical is at a relatively low level 226 shown in solid lines, the float 222 is unseated from the valve seat 224 and liquid chemical can enter the container 212. When the liquid chemical is at a relatively high level 228 shown in broken lines, the float 222 is seated in its seat 224 and liquid chemical is prevented from entering the container 212. The walls of the chamber 217 serves as a guide for the float 222.

Figure 5:
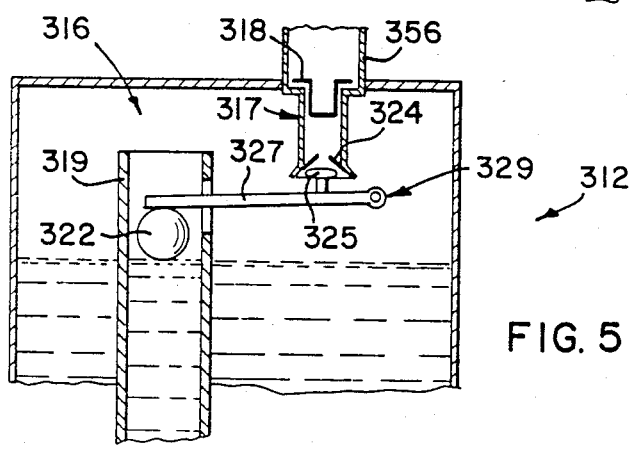

With reference to FIG. 5, yet another embodiment of a liquid chemical container 312 and control means 316 is shown. The embodiment of FIG. 5 is similar to the embodiment of FIG. 4. A conduit 356 leading from a reservoir (not shown) enters the top of the container 312 and open in a chamber 317 having a valve seat 324 at its lower end. A float 322 is mounted on an end of an arm 327 pivotally supported at 329 remote from the float 322. The float is guided in a guide cylinder 319 which is open at its bottom to liquid chemical in the container 312. The arm 327 passes through a slot in the wall of the guide cylinder 319.

A closure member 325 is mounted on the arm 327 intermediate of the float 322 and the pivotal support at 329. Rising of the water to a preselected level inside the container 312 will cause the float 322 and also the closure member 325 to rise correspondingly. The closure member 325 will seat in its seat 324 to prevent more liquid chemical entering the container 312. The arm 327 acts as a lever and the force with which the closure member is seated, is a multiple of the buoyancy force on the float.

Figure 6:
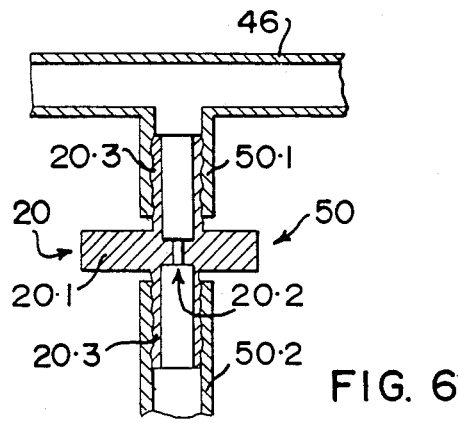
FIG. 6 shows, to a larger scale in sectional side view, a flow-restrictor of the apparatus of FIG. 1.

With reference to FIG. 6, a flow-restrictor 20 is described in more detail. The flow-restrictor 20 is disposed in series between two portions 50.1 and 50.2 of line 50. The arrangement is such that all of the liquid chemical flowing through the branch line 50 must pass via the flow restrictor 20. The flow restrictor 20 is removable and flow restrictors of different flow-restricting capabilities can be used to obtain desired degrees of flow restriction.

The flow restrictor 20 comprises an obtrusively coloured disc 20.1 having a centre passage 20.2 which causes flow restriction and nipples 20.3 on either side of the passage 20.2 to effect easy connection (and thus easy replacement) to the branch line portions 50.1 and 50.2. The outer peripheries of the nipples 20.3 have circumferential ridges to promote connection.

It is envisaged that a plurality of flow restrictors 20 having different flow restricting capabilities will be available for selection. The different flow restrictors will be colour coded to identify them. This has the advantage that a flow restrictor can be identified in use without removing it or even stopping operation of the apparatus. Conveniently the flow restrictor 20 is a moulding of synthetic plastics material. The passage 20.2 can be formed mechanically such as by drilling. The diameter and length of the passage, as well as the finish of its wall, will determine its flow characteristics.

Figure 7:
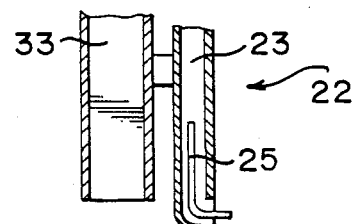
FIG. 7 shows, to a larger scale in sectional side view, administering means of the apparatus of FIG. 1.

With reference again to FIGS. 1 and 2, and also to FIG. 7, each administering means 22 comprises a metal spout 23 provided at the end of each branch line 50. The metal spout 23 is mounted on the metal spout 33 of the fertilizer conduit 32. The open lower end of the metal spout 23 is aligned with the centre of its pair of discs 34 in the intended direction of motion of the planter 26. A short length of L-shaped wire 25 is held captive within the open end of the spout 23. The wire 25 is movable within the end of the spout 23, so that, in use, any granules of soil tending to attach to and to close off the end of the spout 23, can be dislodged.

With reference to FIGS. 1 and 2, the working of the apparatus 10 is now described. The liquid chemical 54 is administered to the seed bed 24 simultaneously with the planting of seeds and the administering of fertilizer by the planter 26. The seed-planting and fertilizer-administering functions of the planter will take place as in conventional planters.

While the stop valve 40 is closed, the reservoir 52 is filled with the liquid chemical 54. The liquid chemical will fill the container 12 to a level determined by the setting of the float valve arrangement 16. Flow restrictors 20 of desired flow restricting capabilities will be installed. The stop valve 40 will now be opened and the rate of flow of liquid chemical will be measured to ensure that it complies with requirements. If the rate of flow has to be adjusted, it can be adjusted by using flow restrictors having more desirable flow-restricting capabilities or by adjustment of the position of the closure element 64 of the float valve arrangement 16 to adjust the level at which the liquid chemical is maintained in the container 12, or both.

Once the correct flow rate has been attained, it will remain constant because the flow restrictors 20 will cause a constant restriction of flow, and the hydraulic head of the liquid chemical which causes flow to take place, will remain constant as the level of liquid chemical in the container is maintained constant.

The stop valve 40 is opened to allow the liquid chemical to flow towards the administering means 22.

As the planter 26 is drawn along a land, the discs 34 of the furrowing device open a furrow in the seed bed 24. Liquid chemical at the desired rate is deposited into the furrow via the administering means 22. The wheels 36 close the furrow and the chain arrangement 38 levels the seed bed 24 after the planter 26 has passed thereover.

Figure 8:
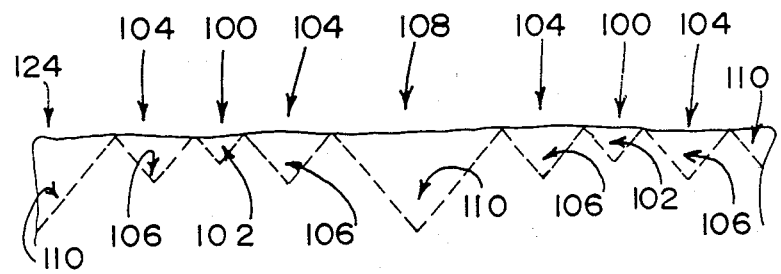
FIG. 8 shows schematically in section, a configuration in which different kinds of liquid chemical are adminstered to a seed bed.

With reference to FIG. 8, a configuration in which different kinds of liquid chemical are administered to a seed bed 124 is shown. Reference numerals 100 indicate laterally spaced lanes of soil treated with fertilizer deposited in relatively shallow furrows 102. The furrows 102 are about 50 millimeters deep and are in the vicinity of maize seeds. Immediately adjacent and on either side of the lanes 100, lanes 104 are treated with a herbicide such as EPTAM or SUTAN, which are currently available in South Africa. The herbicide is deposited in furrows 106. The furrows 106 are about 100 millimeters deep and are laterally spaced about 75 millimeters from the lanes 100. Centrally between adjacent lanes 104, lane 108 is treated with a herbicide administered in a furrow 110 which is about 150 millimeters deep.

It is to be appreciated that liquid chemical, deposited in a line at the bottom of a furrow, will percolate upwardly at an angle through the soil. Thus, soil in a zone appearing triangular in cross-section, will be treated. Such zones are indicated in broken outlines in FIG. 8. The areas treated will be in the form of the lanes which have widths dependent from the angles of percolation and the depths of deposit. The angles of percolation can be established for the conditions at hand, eg experimentally, or from a prior compiled table making provision for different kinds of soil, different degrees of compaction of the soil used to close the furrow, and the like.

The depth of deposit can be regulated by regulating the depth of furrowing. The deeper the placement of the chemical, the wider a lane will be treated and correspondingly more of the chemical must be administered to effect the desired concentration. The required amount of liquid chemical is deposited by suitably adjusting the flow rate of liquid chemical through the relevant flow restrictor 20.

Thus, depending on the width of a lane to be treated, the liquid chemical can be administered at a desired depth, as can be seen from FIG. 8. If desired, for example to treat the wide lane 108, more than one relatively shallow furrow instead of the single deep furrow 110 may be opened to treat a corresponding plurality of relatively narrow lanes.

Figure 9:
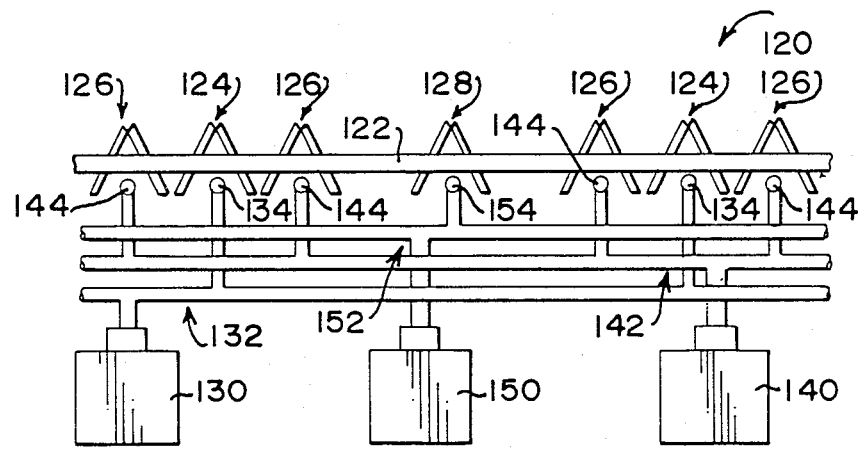
FIG. 9 shows, schematically in plan view, apparatus for administering liquid chemicals in the configuration of FIG. 8.

With reference also to FIG. 9, an implement to effect the configuration of FIG. 8 is indicated generally by reference numeral 120. The implement has a lateral forward beam 122 mounting a plurality of sets of coulters. There are sets of coulters 124 to open the furrows 102, sets of coulters 126 to open the furrows 106 and a set of coulters 128 to open the furrow 110. Conveniently, the sets of coulters are adjustable laterally along the length of the beam 122 to provide for different lateral spacing. Conveniently the sets of coulters are also adjustable upward/downward to provide for different degrees of penetration into a seed bed to open furrows of different depths.

There are provided separate apparatuses in accordance with the invention for the fertilizer, and the herbicide. A container 130, flow line 132 and administering means 134 are arranged to deposit liquid fertilizer in the furrows 102. Containers 140, 150, flow lines 142, 152, and administering means 144, 154, are arranged to deposit herbicide in furrows 106, 110.

Herbicides such as EPTAM or SUNTAN which require to be administered within the soil, fumigants, liquid fertilizers and systemic insecticides, and the like, can be administered by means of apparatus such as the apparatus 120. More than one such liquid chemical can be administered simultaneously.

Figure 10:
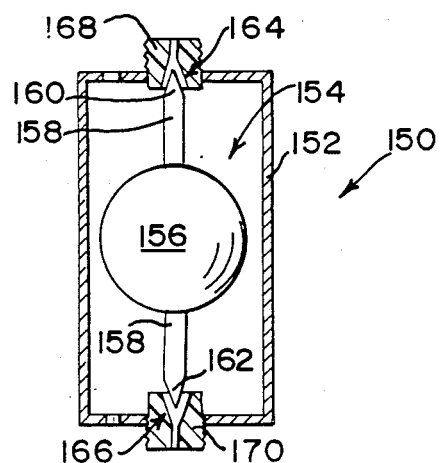
FIG. 10 shows, in sectional side view, to a larger scale, yet a further embodiment of a liquid chemical container and control means.

With reference to FIG. 10, yet a further embodiment of a liquid chemical container and control means assembly is indicated by reference numeral 150. The assembly 150 comprises a container 152, and control means 154 including a spherical buoyant member 156, a diametrically extending stem 158 having pointed ends 160, 162 and valve seats 164 and 166 opposite each other at respectively a roof and a floor of the container 152. The valve seats 164, 166 are defined by valve seat members 168 and 170 mounted in, respectively, the roof and the floor, and providing also nipples to effect connection to, respectively, a reservoir and a flow line. The pointed ends 160, 162 cooperate needle and seat fashion with the valve seats 164, 166 to permit and to prevent flow of liquid chemical in use.

When liquid chemical in the container 152 rises to a desired level, the buoyant member 156 will float upward and will cause the point 160 to be seated in the valve seat 164 to stop inflow of liquid into the container 152. Dropping of liquid chemical below the desired level will cause the member 156 to drop and thus the point 160 to be unseated to permit inflow of liquid chemical. The point 162 will remain unseated to allow outflow of liquid chemical under gravity out of the container. Excessive dropping of the level in the container will cause the member 156 to float downwardly far enough for the point 162 to seat in its valve seat 166 to prevent outflow out of the container. It is envisaged that this will only take place when an abnormal condition arises, such as when the reservoir runs empty, or when a conduit from the reservoir is blocked. Conveniently, an alarm adapted to be triggered when an abnormally low level in the container is experienced, may be provided. The alarm may, for example, be optically triggered.

The Applicant envisages that the embodiment of FIG. 10 will find particular application when an apparatus is to be adapted for operation under laterally sloping conditions as herein described. With reference to FIG. 9, for example, each set of coulters 126, or each pair of coulter sets 126 adjacent a coulter set 124, may be associated with a container such as the container of FIG. 10.

It is an advantage of the embodiments illustrated that the flow rate of liquid chemical can be adjusted relatively easily, after which it will stay substantially constant. It is a further advantage that the liquid chemical can be deposited accurately to a desired depth and in a desired position within the seed bed 24. Furthermore, all of the liquid chemical administered by an administering means is deposited at the same depth at the bottom of a furrow. Thus, when the liquid chemical gasifies and percolates through the soil to the surface of the seed bed, it moves upward from maximum depth ensuring maximum effectivity. This enables the administering of an ideal amount of liquid chemical by means of each administering means taking depth of placement into consideration. In other systems known to the Applicant, the liquid chemical is deposited at varying depths, resulting in a varying concentration towards the surface of the seed bed. Thus, weed seedlings disposed relatively deeply underneath the seed bed, receive only a small concentration which may be ineffective. If the concentration of liquid chemical deposited is increased effectively to kill deep-lying weed seedlings, damage may be caused to the crop due to an increased concentration nearer the surface of the seed bed. The Applicant believes that about twice the ideal amount of liquid chemical is usually administered with other systems known to him.

Thus, the Applicant believes that a substantial saving in the quantity of chemical liquid deposited can be obtained by making use of this invention, thus preventing damage to crops due to over-administering, while still effectively killing deep-lying weed seedlings.

I claim:

1. A method of administering at least one agricultural chemical in liquid form to an agricultural land, the method comprising
   providing at least one supply of said at least one liquid chemical at an elevation position above the agricultural land;
   causing said at least one supply of said at least one liquid chemical to traverse the agricultural land;
   opening the surface of the agricultural land to create a plurality of laterally spaced furrows selectively at desired different depths while traversing the agricultural land;
   permitting the liquid chemical to flow under gravity to the agricultural land;
   maintaining the hydraulic head of the liquid chemical at a substantially constant level while outflow is taking place;
   guiding the liquid chemical flowing under gravity via different flow paths to discharge into said furrows;
   restricting the flow rate of the liquid chemical in each flow path to a desired constant flow rate in dependence on the hydraulic head; and
   closing the furrows after discharge of the liquid chemical.

2. An apparatus for administering at least one agricultural chemical in liquid form to an agricultural land, and being adapted to traverse the agricultural land, the apparatus comprising
   at least one liquid chemical container for containing a liquid chemical in use,
   attachment means for attachment of said chemical container to a support at a desired elevation above the agricultural land,
   an outlet at or near the bottom of said chemical container to permit liquid chemical to flow out of the container under gravity,
   control means adapted to maintain the hydraulic level of the liquid chemical in said container at a substantially constant level while out flow takes place,
   a plurality of flow lines each having a discharge end and each being connected to the outlet of said at least one container for conducting liquid chemical from said container to the agricultural land, the discharge ends of said flow lines being spaced laterally and arranged to administer their respective liquid chemicals in adjacent lanes of limited width;
   liquid flow-restricting means for each flow line provided at a level below the level at which the liquid chemical is maintained in said container in association with its flow line to restrict the flow of liquid chemical in its flow line to a desired constant flow rate dependent from the constant hydraulic head corresponding to the difference in levels of the liquid chemical in the container and the flow-restricting means, adjusting means for independently adjusting the depth of application beneath the land surface of liquid chemical from various of said flow lines, said adjusting means comprising earth opening means to open the surface of the agricultural land to a preselected depth in advance of the discharge end of each said flow line, and means to preselect the depth of each said earth opening means to individually control the depth of application of liquid chemical from each said flow line; and closing means for closing the surface of the agricultural land after discharge of liquid chemical.

3. An apparatus as claim in claim 2, in which the control means comprises level control means in the form of a buoyancy valve arrangement operative in the container and associated with a flow passage arranged to supply liquid chemical from a reservoir to the container, to control flow of liquid from the reservoir in the container, thereby to maintain the liquid chemical in the container at the desired level.

4. An apparatus as claimed in claim 2 in which the flow-restricting means comprises a flow restrictor in the flow line.

5. An apparatus as claimed in claim 2 in which the closing device comprises at least one wheel arranged in use, laterally to displace soil into the furrow and to roll along the top of the closed furrow.

* * * * *